W. F. & D. H. YERIAN.
POULTRY FOUNT.
APPLICATION FILED APR. 17, 1908.
No. 903,041.
Patented Nov. 3, 1908.
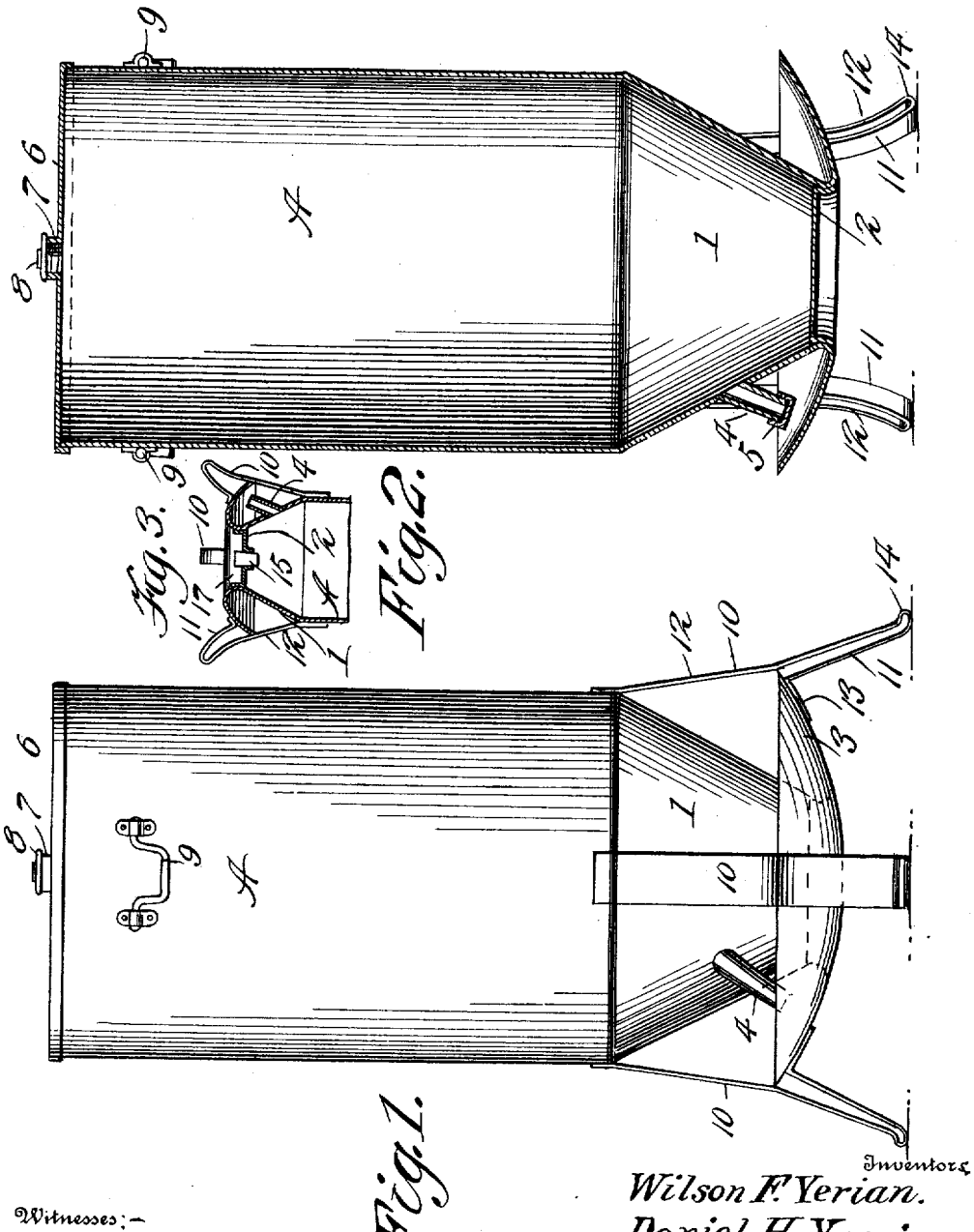
Witnesses:
Jac. P. Wahler
C. Bradway
Inventors
Wilson F. Yerian.
Daniel H. Yerian
By Victor J. Evans,
Attorney.

UNITED STATES PATENT OFFICE.

WILSON F. YERIAN AND DANIEL H. YERIAN, OF FORT WAYNE, INDIANA, ASSIGNORS OF ONE-THIRD TO GEORGE A. CLAPESATTLE, OF FORT WAYNE, INDIANA.

POULTRY-FOUNT.

No. 903,041.　　　Specification of Letters Patent.　　　Patented Nov. 3, 1908.

Application filed April 17, 1908.　Serial No. 427,720.

*To all whom it may concern:*

Be it known that we, WILSON F. YERIAN and DANIEL H. YERIAN, citizens of the United States, residing at Fort Wayne, in the county of Allen and State of Indiana, have invented new and useful Improvements in Poultry-Founts, of which the following is a specification.

This invention relates to drinking founts for poultry or other stock, and relates more particularly to a fount of that type in which the water in the trough is automatically maintained at the proper level so that the only attention required is the periodic filling of the reservoir of the fount.

The invention has for one of its objects to improve and simplify the construction of devices of this character so as to be comparatively easy and inexpensive to manufacture, and of durable and substantial design.

Another object of the invention is the provision of a fount in which the lower end of the reservoir is frusto-conical and formed with a trough immediately surrounding the frusto-conical portion so that the periphery of the trough does not project appreciably beyond the sides of the fount for the purpose of preventing the poultry getting into the trough and dirtying the water, the reservoir being provided with a spout that leads into the trough to supply the water thereto and maintain the water at the desired level.

Another object of the invention is the provision of a poultry fount of this character equipped with legs that are attached to the body of the fount and to the rim of the trough to serve as braces for the latter as well as legs for supporting the trough.

With these objects in view and others, as will appear as the description proceeds, the invention comprises the various novel features of construction and arrangement of parts which will be more fully described and set forth with particularity in the claims appended hereto.

In the accompanying drawing, which illustrates one of the embodiments of the invention, Figure 1 is a side elevation of the fount. Fig. 2 is a central vertical section thereof. Fig. 3 is a fragmentary sectional view of the lower portion of a modified form of fount shown in inverted position preparatory to filling.

Similar reference characters are employed to designate corresponding parts throughout the several views.

Referring to the drawing, A designates the body or reservoir of the fount which is preferably made of sheet metal and in cylindrical form with the bottom portion 1 thereof tapered into the form of an inverted frustum of a cone. The bottom of the reservoir is closed by a bottom plate or disk 2, and the reservoir is formed with an annular trough 3 encircling the lower portion of the conical part 1. It is to be noted that the trough is approximately the same diameter as the body of the fount, so that there will be no temptation for the fowl or other stock to step into the trough and soil the water, there being only room enough between the outer edge of the trough and the frusto-conical portion 1 for the fowl to reach the water for drinking. Extending into the trough is a spout 4 that is connected with the frusto-conical portion 1 and is equipped with a cap 5 which prevents the water from overflowing in the trough during the filling operation. In the large sized founts, the top 6 is provided with a filling opening 7 that is normally closed or sealed by a cap 8, and in order to conveniently carry the fount, handles 9 are provided at the sides of the reservoir A. The fount is supported on legs 10 that consist of strips of metal of suitable length and each doubled back on itself to form portions 11 and 12 of different lengths. The portions 12 are soldered or otherwise suitably secured to the bottom of the cylindrical portion of the reservoir A, while the portions 11 are bent into ears 13 that are soldered or otherwise suitably secured to the under side of the trough 3 adjacent the periphery thereof. The bends 14 of the legs form the feet therefor, the legs being inclined outwardly so as to provide a stable supporting base. Legs of this construction not only serve to support the fount in upright position but act as braces for the trough and prevent injury thereto.

In filling the fount, the cap 5 is first applied to the trough and the water then supplied to the reservoir through the openings 7 in the top 6. When a sufficient quantity of water has been supplied, the cap 8 is inserted in the opening to tightly seal the latter and then the cap 5 is removed, whereupon water will flow into the trough until the level reaches the lower end of the spout. At this point, the atmospheric pressure within the reservoir is cut off so that no more water will flow out of the spout. As the water in the trough is consumed, the level will fall so that the water in the reservoir is again subjected to atmospheric pressure which causes water to flow out of the spout until the normal level in the trough is reached. In this way, the trough is self-fed until the reservoir is empty.

In the smaller founts, the top filling opening is dispensed with and the bottom 2, as shown in Fig. 3, is provided with a filling opening normally closed by a stopper 15. The bottom 2 is set into the lower end of the reservoir so that a funnel-like chamber 17 is provided. In filling a fount of this kind, the same is inverted and the stopper 15 removed. Water is then filled into the funnel chamber 17 from which it flows through the opening into the reservoir. After being thus filled, the stopper 15 is inserted in the opening and the fount inverted or returned to its normal position so as to permit water to flow into the trough through the spout 4, there being no necessity for a spout cap in this case.

From the foregoing description, taken in connection with the accompanying drawing, the advantages of the construction and of the method of operation will be readily apparent to those skilled in the art to which the invention appertains, and while we have described the principle of operation of the invention, together with the device which we now consider to be the best embodiment thereof, we desire to have it understood that the device shown is merely illustrative, and that such changes may be made when desired as are within the scope of the claims appended hereto.

Having thus described the invention, what we claim is:—

1. A drinking fount comprising a reservoir constructed of sheet metal and having its lower end contracted into frusto-conical form and bent outwardly and upwardly to constitute a shallow trough, a bottom plate closing the narrowest portion of the frusto-conical part of the reservoir, a spout attached to the frusto-conical part of the reservoir and extending downwardly into the trough, and members disposed around the lower end of the fount and projecting below the bottom of the trough, said members being rigidly secured to both the reservoir and trough to serve as braces for the latter.

2. A drinking fount comprising a reservoir, a trough extending around the lower end thereof, a spout communicating with the reservoir and extending into the trough, legs having portions connected with the outside of the reservoir and connected with the trough adjacent the periphery thereof and extending below the bottom of the trough, and means on the reservoir whereby the same may be filled.

3. A drinking fount comprising a reservoir tapered at its lower end and formed with an annular trough extending around the said tapered end, a supply spout on the reservoir and extending into the trough, and legs consisting of doubled strips having their ends secured to the reservoir and trough and extending below the latter.

In testimony whereof we affix our signatures in presence of two witnesses.

WILSON F. YERIAN.
DANIEL H. YERIAN.

Witnesses:
W. F. DINIUS,
H. E. TEETERS.